US011334470B2

(12) United States Patent
Kahn et al.

(10) Patent No.: US 11,334,470 B2
(45) Date of Patent: May 17, 2022

(54) AUTOMATED BROWSER TESTING ASSERTION ON NATIVE FILE FORMATS

(71) Applicant: Box, Inc., Redwood City, CA (US)

(72) Inventors: Andrew Kahn, San Mateo, CA (US); Claudio Bartolini, Palo Alto, CA (US); Denali Lumma, Los Gatos, CA (US)

(73) Assignee: Box, Inc., Redwood City, CA (US)

( * ) Notice: Subject to any disclaimer, the term of this patent is extended or adjusted under 35 U.S.C. 154(b) by 437 days.

(21) Appl. No.: 16/565,693

(22) Filed: Sep. 10, 2019

(65) Prior Publication Data

US 2020/0394124 A1    Dec. 17, 2020

Related U.S. Application Data

(60) Provisional application No. 62/860,932, filed on Jun. 13, 2019.

(51) Int. Cl.
*G06F 11/00* (2006.01)
*G06F 11/36* (2006.01)
*G06F 16/958* (2019.01)

(52) U.S. Cl.
CPC ...... *G06F 11/3664* (2013.01); *G06F 11/3688* (2013.01); *G06F 16/986* (2019.01)

(58) Field of Classification Search
CPC . G06F 11/3664; G06F 11/3688; G06F 16/986
See application file for complete search history.

(56) References Cited

U.S. PATENT DOCUMENTS

| 10,223,239 B1* | 3/2019 | Ghanbaran | G06F 11/3672 |
| 2006/0085132 A1* | 4/2006 | Sharma | G06F 11/3688 |
| | | | 702/1 |
| 2009/0100345 A1* | 4/2009 | Miller | G06F 11/3668 |
| | | | 715/738 |
| 2013/0024845 A1* | 1/2013 | Lanzkron | G06F 11/3688 |
| | | | 717/130 |

* cited by examiner

*Primary Examiner* — Joshua P Lottich
(74) *Attorney, Agent, or Firm* — Sheridan Ross P.C.

(57) ABSTRACT

Embodiments provide systems and methods for performing automated browser testing on different native file types by receiving files of different types. A preview version of each file can be generated and rendered in an output file type. Generating the preview version can be performed by a preview application executed by the testing system and rendering the preview version of the first file can be performed by a browser application executed by the testing system. The output file type can be different from the received file type. For example, the received file type can be a native file type of a first application different from the browser and the output file type comprises an HyperText Markup Language (HTML) file type. A test can be executed on the rendered preview version based on one or more assertions on the first file.

20 Claims, 5 Drawing Sheets

AUTOMATED BROWSER TESTING ASSERTION ON NATIVE FILE FORMATS

CROSS REFERENCE TO RELATED APPLICATION

The present application claims the benefits of and priority, under 35 U.S.C. § 119(e), to U.S. Provisional Application No. 62/860,932 filed Jun. 13, 2019 by Kahn et. al. and entitled "Automated Browser Testing Assertion on Native File Formats" of which the entire disclosure is incorporated herein by reference for all purposes.

FIELD OF THE DISCLOSURE

Embodiments of the present disclosure relate generally to methods and systems for automated testing of software and more particularly to performing automated browser testing on different native file types.

BACKGROUND

In software testing, test automation is the use of software separate from the software being tested to control the execution of tests and the comparison of actual outcomes with predicted outcomes. Test automation can automate some repetitive but necessary tasks in a formalized testing process already in place, or perform additional testing that would be difficult to do manually. A test assertion is an expression which encapsulates some testable logic specified about a target under test. The expression is formally presented as an assertion, along with some form of identifier, to help testers and engineers ensure that tests of the target relate properly and clearly to the corresponding specified statements about the target. Assertion testing is a type of testing consisting in verifying if the conditions expressed therein confirm the product requirements.

In some environments, such as an online collaboration environment, application must be able to operate with files of various types related to a number of different types of applications. For example, an application executing in a workspace of a collaboration environment may need to operate with file from a word processor application, email application, spreadsheet application, desktop publishing application, etc. Current automated testing approaches would require a separate set of tests and assertions for each different file type. This creates not only inefficiencies in the testing process but also the possibility for errors and/or inconsistent results. Hence, there is a need for improved methods and systems for automated testing of files of different types.

BRIEF SUMMARY

Embodiments of the disclosure provide systems and methods for performing automated browser testing on different native file types. According to one embodiment, a method for performing automated browser testing on different native file types can comprise receiving a first file available in a repository. The first file can have a first file type. A preview version of the first file can be generated and rendered in an output file type. Generating the preview version of the first file can be performed by a preview application executed by the testing system and rendering the preview version of the first file can be performed by a browser application executed by the testing system. The output file type can be different from the first file type. For example, the first file type can be a native file type of a first application different from the browser and the output file type comprises an HyperText Markup Language (HTML) file type. A test can be executed on the rendered preview version of the first file based on one or more assertions on the first file.

A second file available in the repository can also be received. The second file can have a second file type different from the first file type and the output file type. The second file type can be a native file type of a second application different from the first application and the browser. For example, the first file type and second file type comprise two of a plurality of different document file types, a plurality of different image file types, a plurality of different video file types, a plurality of different three-dimensional model file types, etc. A preview version of the second file can also be generated by the preview application, rendered by the browser application in the output file type, and a test can be executed on the rendered preview version of the second file based on one or more assertions on the second file.

In some cases, executing the test on the rendered preview version of the first file and executing the test on the rendered preview version of the second file can comprise controlling operation of the browser application. For example, controlling operation of the browser application while executing the test on the rendered preview of the first file can comprise causing the browser application to receive the second file and render the preview version of the second file. An indication of a result of executing the test on the rendered version of the first file can be provided as verification of the first file and an indication of a result of executing the test on the rendered version of the second file can be provided as verification of the second file.

According to another embodiment, a system can comprise a processor and a memory coupled with and readable by the processor. The memory can store therein a set of instructions which, when executed by the processor, causes the processor to perform automated browser testing on different native file types by receiving a first file available in a repository. The first file can have a first file type. The instructions can further cause the processor to generate a preview version of the first file in an output file type and render the generated output file. For example, generating the preview version of the first file can be performed by a preview application executed by the testing system and rendering the preview version of the first file can be performed by a browser application executed by the testing system. The output file type can be different from the first file type. For example, the first file type can be a native file type of a first application different from the browser and the output file type comprises an HTML file type. The instructions can further cause the processor to execute a test on the rendered preview version of the first file based on one or more assertions on the first file.

The instructions can further cause the processor to receive a second file available in the repository. The second file can have a second file type different from the first file type and the output file type. The second file type can be a native file type of a second application different from the first application and the browser. For example, the first file type and second file type comprise two of a plurality of different document file types, a plurality of different image file types, a plurality of different video file types, a plurality of different three-dimensional model file types, etc. The instructions can further cause the processor to generate a preview version of the second file, render the preview version of the second file in the output file type, and execute a test on the rendered preview version of the second file based on one or more assertions on the second file.

In some cases, executing the test on the rendered preview version of the first file and executing the test on the rendered preview version of the second file can comprise controlling operation of the browser application. For example, controlling operation of the browser application while executing the test on the rendered preview of the first file can comprise causing the browser application to receive the second file and render the preview version of the second file. The instructions can further cause the processor to provide an indication of a result of executing the test on the rendered version of the first file as verification of the first file and provide an indication of a result of executing the test on the rendered version of the second file as verification of the second file.

According to yet another embodiment, a non-transitory, computer-readable medium comprising a set of instructions stored therein which, when executed by a processor, causes the processor to perform automated browser testing on different native file types by receiving a first file available in a repository. The first file can have a first file type. The instructions can further cause the processor to generate and render a preview version of the first file can be rendered in an output file type. For example, generating the preview version of the first file can be performed by a preview application executed by the testing system and rendering the preview version of the first file can be performed by a browser application executed by the testing system. The output file type can be different from the first file type. For example, the first file type can be a native file type of a first application different from the browser and the output file type comprises an HTML file type. The instructions can further cause the processor to execute a test on the rendered preview version of the first file based on one or more assertions on the first file.

The instructions can further cause the processor to receive a second file available in the repository. The second file can have a second file type different from the first file type and the output file type. The second file type can be a native file type of a second application different from the first application and the browser. For example, the first file type and second file type comprise two of a plurality of different document file types, a plurality of different image file types, a plurality of different video file types, a plurality of different three-dimensional model file types, etc. The instructions can further cause the processor to generate and render a preview version of the second file in the output file type and execute a test on the rendered preview version of the second file based on one or more assertions on the second file.

In some cases, executing the test on the rendered preview version of the first file and executing the test on the rendered preview version of the second file can comprise controlling operation of the browser application. For example, controlling operation of the browser application while executing the test on the rendered preview of the first file can comprise causing the browser application to receive the second file and render the preview version of the second file. The instructions can further cause the processor to provide an indication of a result of executing the test on the rendered version of the first file as verification of the first file and provide an indication of a result of executing the test on the rendered version of the second file as verification of the second file.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
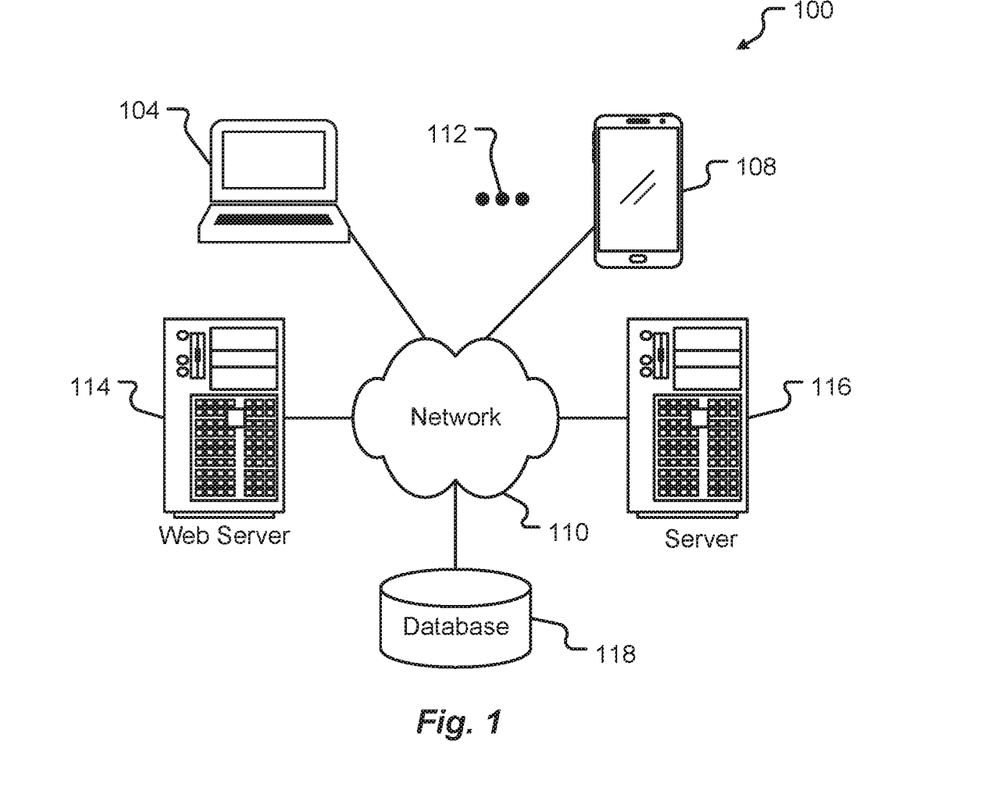
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
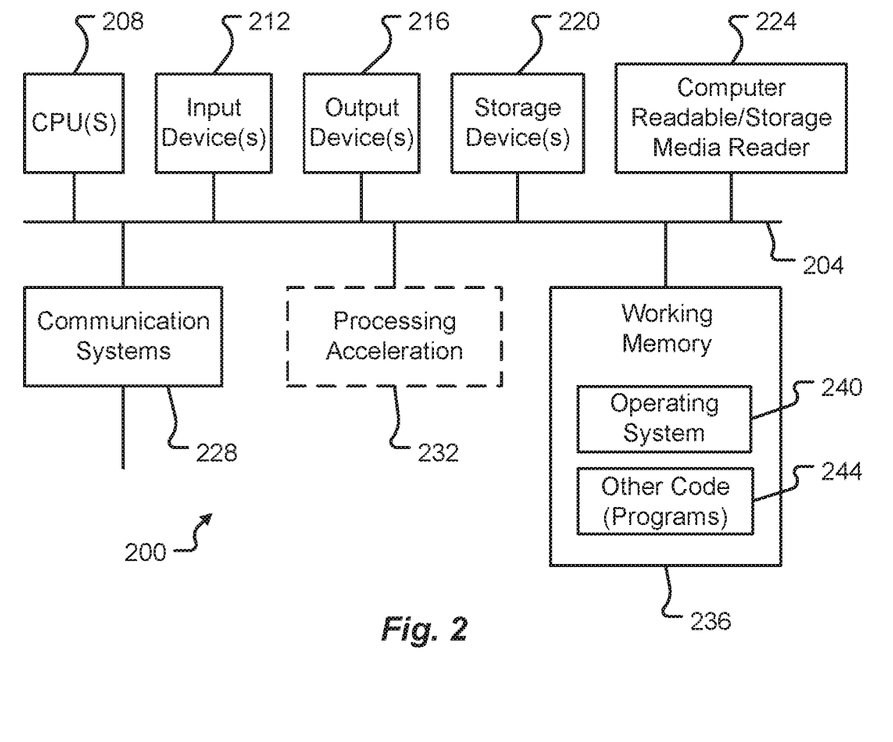
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
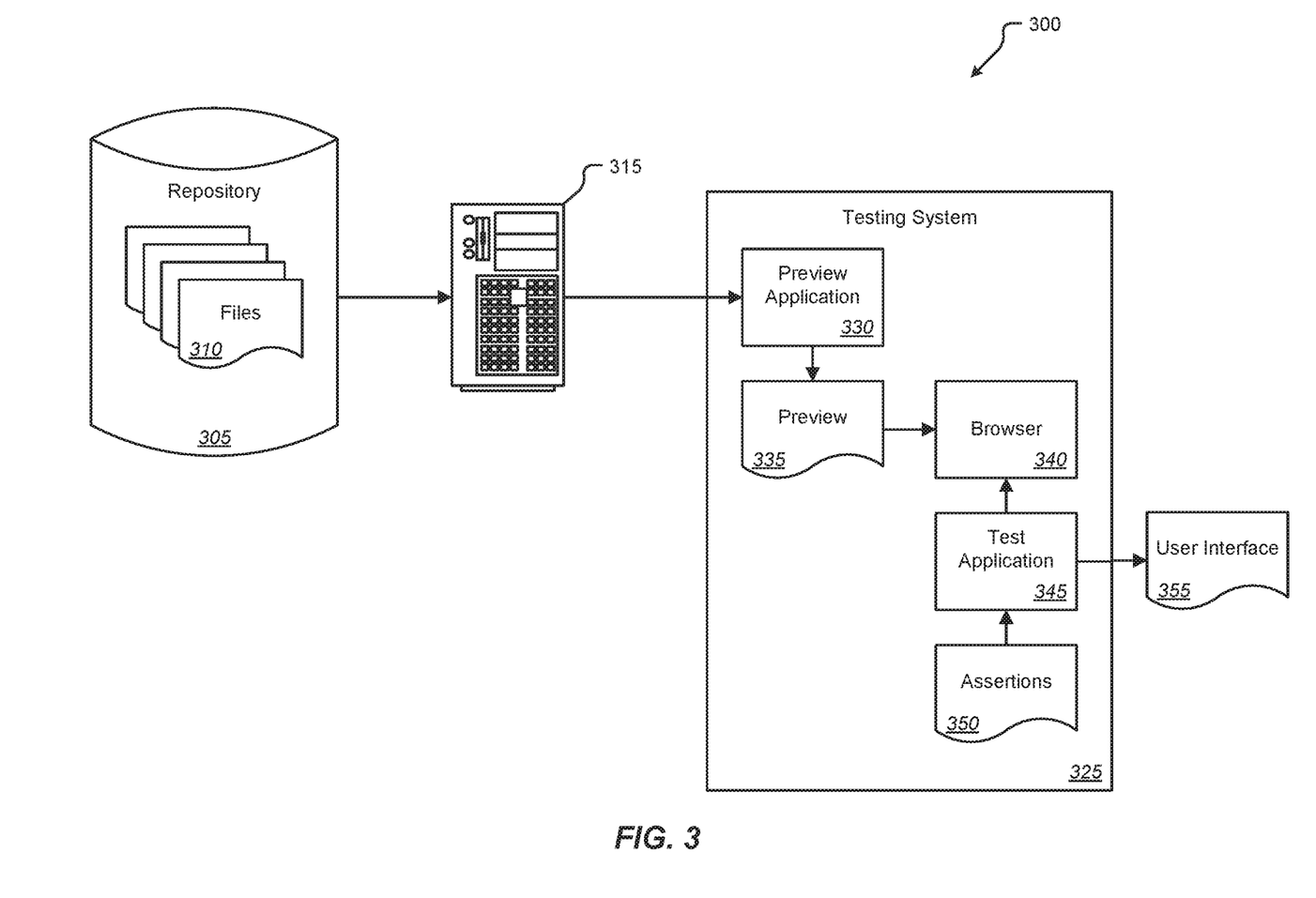
FIG. 3 is a block diagram illustrating elements of an exemplary system for performing automated browser testing on different native file types according to one embodiment of the present disclosure.

FIG. 3 is a block diagram illustrating elements of an exemplary system for performing automated browser testing on different native file types according to one embodiment of the present disclosure. As illustrated in this example, a system 300 for performing automated browser testing on different native file types can comprise a repository 305 of files 310 and one or more servers 315 communicatively coupled with the repository via a communication network (not shown here) comprising any one or more wired and/or wireless networks as described above. The servers 315 can comprise one or more web servers, application server(s), and/or any other server or computer as described above. The server(s) 315 can provide a ser of cloud services. The cloud services can maintain and provide access to the files 310 in the repository 305. For example, the cloud services can provide for remote, cloud-based backup and storage of the files 310. In some cases, the cloud services can provide a collaboration environment. Generally speaking, a collaboration environment can comprise a cloud-based virtual workspace in which the files 310 can be shared as work items among a group of users.

The system can also include a testing system 325 communicatively coupled with the server(s) 315 via a communication network (not shown here) comprising any one or more wired and/or wireless networks as described above. The testing system 325 can comprise, any of a variety of desktop or laptop computer systems as described above. Generally speaking, the testing system 325 can access files 310 in the repository 305 through the server 315 and perform testing on the files 310 and the applications to which they relate. As is common in some environments, such as in a cloud-based collaboration environment, the files 310 can comprise a variety of different file types. For example, the files 310 can comprise native file types for a number of different applications including, but not limited to, a word processing application, a spreadsheet application, an email application, a desktop publishing application, an image or graphics editing application, a video editor or viewer application, or another type of application. The testing system 325 can provide for automated testing in a uniform manner using a set of assertions defined for the files regardless of the type of file being tested.

More specifically, the testing system 325 can comprise a preview application 330 which reads the files 310 from the repository 305 through the server(s) 315 and generates a preview version 335 of each file to be tested. This preview version 335 can comprise a file type different from the file type for the original file 310 in the repository 305. For example, the preview application 330 can, regardless of the original file type, generate a HyperText Markup Language (HTML) file. The preview version 335 can be generated in a number of different ways. Examples of methods and systems that can be used to implement the preview application 330 are described in commonly assigned U.S. Pat. No. 9,063,912 filed on Jun. 22, 2011 by Seibert et. al. and entitled "Multimedia Content Preview Rendering in a Cloud Content Management System," U.S. Pat. No. 9,098,474 filed Aug. 20, 2012 by Lockhart et. al. and entitled "Preview Pre-Generation Based on Heuristics and Algorithmic Prediction/Assessment of Predicted User Behavior for Enhancement of User Experience," and U.S. Pat. No. 9,195,636 filed Mar. 7, 2012 by Smith et. al. and entitled "Universal File Types Preview for Mobile Devices" of which the entire disclosure of each is incorporated herein for all purposes.

Once the preview version 335 of a file has been generated by the preview application 330, it can be rendered by a browser 340 executed by the testing system 325. The testing system 325 can also execute a test application 345 which applies one or more assertions 350 to the preview version 335 rendered by the browser 340 in order to test the original file 310 and the application to which it relates. According to one embodiment, the test application 345 can comprise the Cypress.io tool, for example. The assertions 350 can be defined, as also known in the art, in libraries for such tools. For example, in implementations using the Cypress.io tool, the assertions 450 can be defined in the Cypress assertion library Chai. The test application 345 can also provide a user interface 355 such as a graphical and/or textual interface. Through the user interface 355, the test application 345 can provide indications of results of the assertions, e.g., whether each assertion made on the file is successful.

Generally speaking, a test assertion is an expression of testable logic on a certain target. Each assertion can be directed to a particular aspect of the target and can define specific conditions for the target and expected results for the tested aspect of the target. For example, for a particular type of report, certain fields should be present. An assertion can test that a generated report of this type does in fact include one or more expected fields. Using assertions, a wide variety of aspects for targets of different types may be tested.

For example, and according to one embodiment, some assertions can be content based, i.e., directed to the directed to particular pieces of data within a certain target. Similar to the example of the test that a generated report of a particular type includes one or more expected fields, these assertions can validate a target based on the data therein, e.g., a selected report includes certain fields with certain values (a date range, for example), as expected. Such assertions can also be used to validate that a given input generates an expected output in the target.

According to an additional or alternative embodiment, some assertions can be directed to metadata or properties of the target. That is, rather than the actual content of the target, some assertions can test metadata associated with a file or other target, properties of the target defined in metadata or elsewhere, attributes associated with a particular object or other target, etc. Metadata, properties, attributes, etc. of a target can be made available through the preview application 330 described above and can be used to apply various different tests. For example, assertions can be written to validate or check revisions or versions of a target where the current revision or version number is identified in metadata of the target or elsewhere. Such an assertion can test, for example, whether certain data appears or does not appear depending on the version of the target. Such assertions can be used to do regression tests based on versioning. In other words, assertions can be used not only to check what content is present or available in the target document, file, or other data but also how does that change over the history and lifecycle of the target.

In yet another embodiment, assertions can additionally or alternatively be permissions based. More specifically, an assertion can cause the test application 345 and preview application 330 to a target file using a certain identity and/or credential. Such an assertion can therefore test file access permissions. For example, if a target file is accessed through the preview application 330 without permission, i.e., using an identity and/or credential that is not authorized, an error, perhaps with a code and/or explanation, will be generated rather than a preview version for rendering and testing. Such assertions can also test an access policy. For example, some policies may allow access to certain data by certain individuals/credentials. So, if the policy is applied correctly, the identified data will not viewable in the preview version for certain identities/credentials.

Additionally, or alternatively, and in still another embodiment, some assertions can be directed to an image comparison. That is, the rendered version of the file under test can be an image format. This image can be compared to a validation image using image comparison methods known in the art. Such tests can be used, for example, to confirm the presence of certain features with the file under test such as a watermark or other visible or steganographically inserted mark.

It should be noted and understood that these various types of assertions need not be mutually exclusive. Rather, any particular assertion or set of assertions can apply any or all of these different types of tests in combination. For example, various assertions can combine validation of content, i.e., a content based assertion, but also based on permissions. Such an assertion can, for example, test that when a certain identity or credential is used to access a particular target file, some fields of data which are restricted and for which the identity or credential is not authorized, are redacted or otherwise not available for viewing in the preview version. Similarly, an image comparison assertion can also consider or test based on metadata for the target file. For example, an assertion can validate that a certain version of a target file is watermarked while another version is not. Other examples of assertions, different types of assertions, and various combinations thereof are contemplated and considered to be within the scope of the present disclosure.

Figure 4:
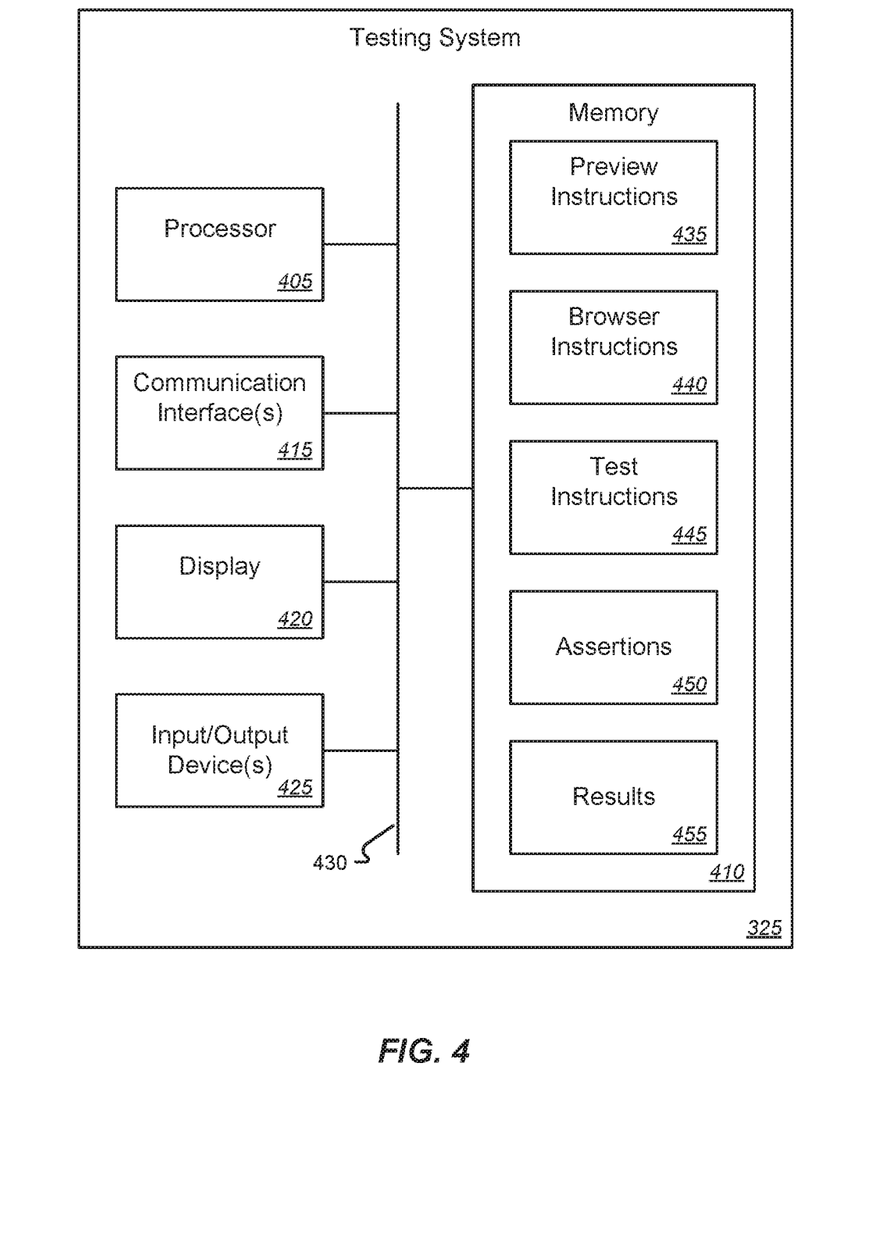
FIG. 4 is a block diagram illustration elements of an exemplary testing system for automated browser testing on different native file types according to one embodiment of the present disclosure.

FIG. 4 is a block diagram illustration elements of an exemplary testing system for automated browser testing on different native file types according to one embodiment of the present disclosure. As illustrated in this example, a testing system 325 can comprise a processor 405 such as any of the various types of processors described above. A memory 410 can be coupled with and readable by the processor 405 via a communications bus 430. The memory 410 can comprises any one or more of the different types of volatile and/or non-volatile memories described above. The processor 405 can also be coupled with one or more communication interfaces 415, a display 420, and one or more input/output devices 425 via the communications bus 430. The communication interfaces 415 can comprise any of a variety of wired or wireless communications interfaces for connecting the testing system 325 to a communications network as described above and as known in the art. The display 420 can comprise, for example, a Liquid Crystal Display (LCD), Light Emitting Diode (LED) display, Organic Light Emitting Diode (OLED) display, Plasma Display Panel (PDP), or any similar display as known in the art. The input/output devices 425 can include, but are not limited to a mouse, touchpad, keyboard, camera, microphone, speakers, etc.

The memory 410 can store therein sets of instructions which, when executed by the processor 405, cause the processor 405 to perform automated browser testing on different native file types. More specifically, the memory can include a set of preview instructions 435 related to a preview client application 330 as described above, a set of browser instructions 440 related to a browser application 340 as described above, and a set of testing instructions 445 related to a test application 345 as described above. The memory 410 can also store a set of assertions 450 to be applied by the testing instructions 445 against one or more files as will be described. The assertions 450 can be received though the communication interfaces 415 from another system and/or can be defined, in whole or in part, by a user of the testing system 325, e.g., through the input/output devices 425.

These instructions, when executed by the processor 405, can cause the processor 405 to receive, through the communication interfaces 415, a file available in a repository, e.g., a file 310A from a repository 305 as described above. For example, the testing instructions 445, based on an assertion 450, can cause the processor 405 to execute the preview instructions 435, i.e., invoke the preview application, which in turn can cause the processor to request and receive the file from the server 315 through the communication interfaces 415. Once the file is received, the preview instructions 435 can cause the processor 405 to generate a preview version of the file in an output file type and the browser instructions 440 can cause the processor 405 to render the preview version of the file.

For example, the received file can have a file type, such as a native file type for a native file type for an application such as a word processing application, a spreadsheet application, an email application, a desktop publishing application, an image or graphics editing application, a video editor or viewer application, or another type of application different from the browser application. The output file type for the generated preview can comprise an HTML file type. Details of systems and methods for generating such previews, as may be implemented in the preview instructions 435, are described in detail in the U.S. Patents referenced above and incorporated herein.

Once the file has been received and the preview version in the output file type has been generated and rendered, the testing instructions 445 can further cause the processor 405 to execute a test on the rendered preview version of the file based on one or more assertions 450 on the first file. Executing the test on the rendered preview version of the file can be performed in any of a variety of ways as known in the art and may be performed using any of a number of available tools. For example, the testing instructions 445 can comprise the Cypress.io tool. The assertions 450 can be defined, as also known in the art, in libraries for such tools. For example, in implementations using the Cypress.io tool, the assertions 450 can be defined in the Cypress assertion library Chai.

The testing instructions 435 can cause the processor 405 to continue testing the assertions 450 against the preview version of the file. In some cases, the test may apply an assertion against additional files. Accordingly, the testing instructions 445, based on an assertion 450, can cause the processor 405 to execute the preview instructions 435, i.e., invoke the preview application, which in turn can cause the processor 405 to request and receive the subsequent file or files from the server 315 through the communication interfaces 415. Once the file(s) are received, the preview instructions 435 can cause the processor 405 to generate a preview version of the file(s) in an output file type, the browser instructions 440 can cause the processor 405 to render the preview version of the file(s) and the testing instructions 445 can cause the processor 405 to apply the assertions against the rendered preview(s). The subsequent file(s) can have a file type different from the file type of the first or previous file(s) and the output file type. For example, each file type can be a native file type of a different application. For example, the file types can comprise different document file types, different image file types, different video file types, different three-dimensional model file types, etc.

The testing instructions 445 can further cause the processor 405 to generate a set of results 455 based on the assertions applied to the file(s). The results 450 can indicate whether each assertion was satisfied. In this way, the file and the application related to the file can be verified. The testing instructions 445 can also cause the processor 405 to provide an indication of the result of executing the tests on the rendered version of the files as verification of the files. For example, the indication can be provided through a user interface 355 as described above and presented though the display 450 of the testing system 325.

Figure 5:
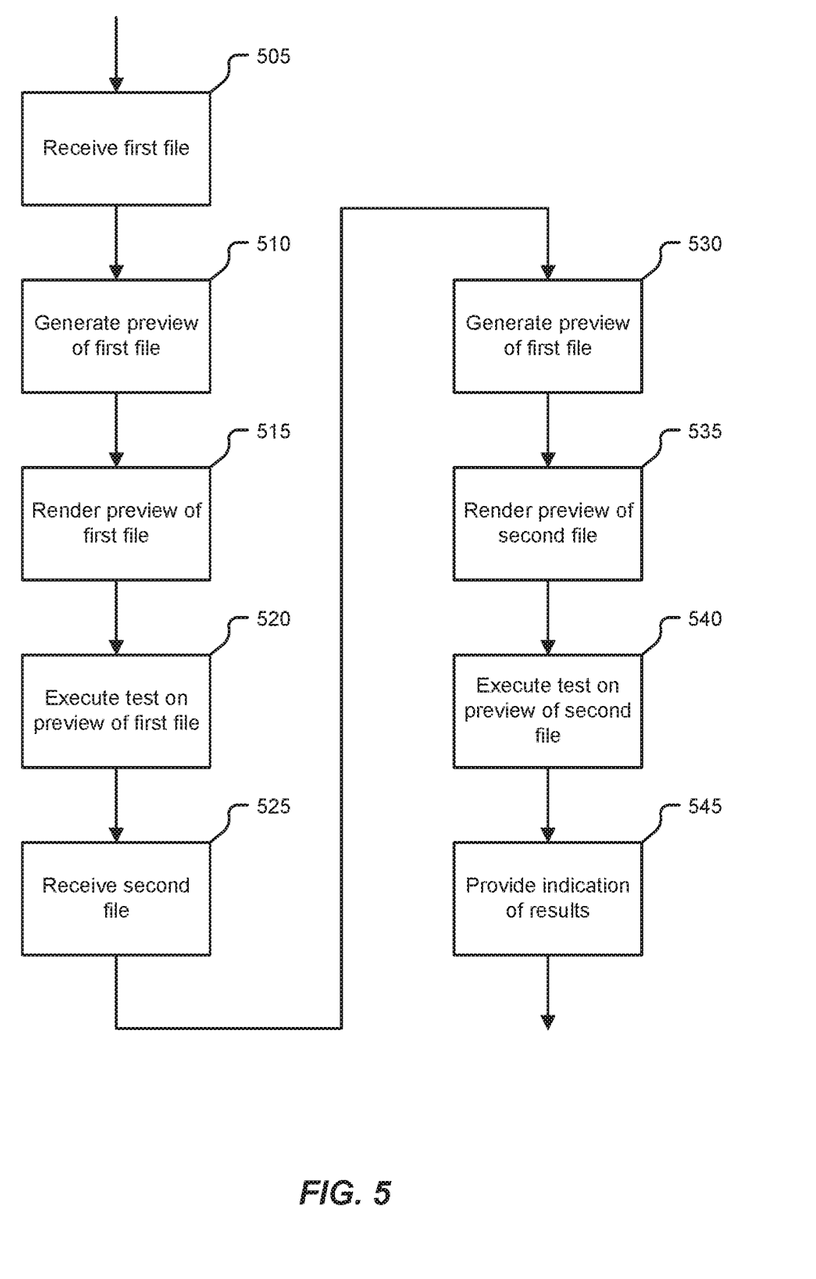
FIG. 5 is a flowchart illustrating an exemplary process for performing automated browser testing on different native file types according to one embodiment of the present disclosure.

FIG. 5 is a flowchart illustrating an exemplary process for performing automated browser testing on different native file types according to one embodiment of the present disclosure. As illustrated in this example, performing automated browser testing on different native file types can comprise receiving 505, retrieving, or reading a first file available in a repository, e.g., in an cloud-based storage and/or collaboration system. The first file can have a first file type. A preview version of the first file can be generated 510 and rendered 515 in an output file type. Generating 510 the preview version of the first file can be performed by a preview application executed by the testing system and rendering 510 the preview version of the first file can be performed by a browser application executed by the testing system. The output file type can be different from the first file type. For example, the first file type can be a native file type of a first application different from the browser, e.g., a word processor, spreadsheet application, email application, desktop publishing application, image editor or viewer, video editor or viewer, etc., and the output file type comprises an HyperText Markup Language (HTML) file type. Once the preview of the first file has been rendered 515 by the browser, a test can be executed 520 on the rendered preview version of the first file based on one or more assertions on the first file. Executing 520 the test on the rendered preview version of the first file can be performed in any of a variety of ways as known in the art and may be performed using any of a number of available tools including, but not limited to, Cypress.io, for example. The assertions can be defined, as also known in the art, in libraries for such tools. For example, in implementations using the Cypress.io tools, the assertions can be defined in the Cypress assertion library Chai.

A second file available in the repository can also be received 525, retrieved, or read. The second file can have a second file type different from the first file type and the output file type. The second file type can be a native file type of a second application, e.g., a word processor, spreadsheet application, email application, desktop publishing application, image editor or viewer, video editor or viewer, etc., but different from the first application and the browser. For example, the first file type and second file type can comprise two of a plurality of different document file types, a plurality of different image file types, a plurality of different video file types, a plurality of different three-dimensional model file types, etc. A preview version of the second file can also be generated 530 in the output file type by the preview application, rendered 535 and the browser application, and a test can be executed 540 on the rendered preview version of the second file based on one or more assertions on the second file in the same manner as described above regarding the first file.

In some cases, executing 520 the test on the rendered preview version of the first file and executing 540 the test on the rendered preview version of the second file can comprise controlling operation of the browser application. For example, controlling operation of the browser application while executing 520 the test on the rendered preview of the first file can comprise causing the browser application to request and receive 525 the second file and render the preview version of the second file.

Once execution 520 and 540 of the tests have been completed, an indication of results of the tests can be provided 545. The provided 545 results can indicate an outcome of testing the assertions for the first file on the rendered version of the first file as verification of the first file and, therefore, a least a partial verification of the first application. Similarly, the provided 545 results can indicate an outcome of testing the assertions for the second file on the rendered version of the second file as verification of the second file and, therefore, a least a partial verification of the second application.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing automated browser testing on different native file types, the method comprising:
   receiving, by a testing system, a first file available in a repository, the first file having a first file type;
   generating, by the testing system, a preview version of the first file in an output file type, the output file type being different from the first file type;
   rendering, by the testing system, the preview version of the first file in the output file type;
   executing, by the testing system, a test on the rendered preview version of the first file, wherein the tests are executed based on one or more assertions on the first file;
   receiving, by the testing system, a second file available in the repository, the second file having a second file type, wherein the second file type is different from the first file type and the output file type;
   generating, by the testing system, a preview version of the second file in the output file type;
   rendering, by the testing system, the preview version of the second file in the output file type;

executing, by the testing system, a test on the rendered preview version of the second file, wherein the tests are executed based on one or more assertions on the second file;

providing, by the testing system, an indication of a result of executing the test on the rendered version of the first file as verification of the first file; and providing, by the testing system, an indication of a result of executing the test on the rendered version of the second file as verification of the second file.

2. The method of claim 1, wherein generating the preview version of the first file and generating the preview version of the second file are performed by a preview application executed by the testing system and wherein rendering the preview version of the first file and rendering the preview version of the second file are performed by a browser application executed by the testing system.

3. The method of claim 2, wherein the output file type comprises an HyperText Markup Language (HTML) file type.

4. The method of claim 3, wherein first file type and second file type comprise two of a plurality of different document file types, a plurality of different image file types, a plurality of different video file types, or a plurality of different three-dimensional model file types.

5. The method of claim 2, wherein executing the test on the rendered preview version of the first file and executing the test on the rendered preview version of the second file comprises controlling operation of the browser application.

6. The method of claim 5, wherein controlling operation of the browser application while executing the test on the rendered preview of the first file comprises causing the browser application to receive the second file and render the preview version of the second file.

7. The method of claim 2, wherein the first file type is a native file type of a first application different from the browser and wherein the second file type is a native file type of a second application different from the first application and the browser.

8. A system comprising;
a processor; and
a memory coupled with and readable by the processor and storing therein a set of instructions which, when executed by the processor, causes the processor to perform automated browser testing on different native file types by:
receiving a first file available in a repository, the first file having a first file type;
generating a preview version of the first file in an output file type, the output file type being different from the first file type;
rendering the preview version of the first file in the output file type;
executing a test on the rendered preview version of the first file, wherein the tests are executed based on one or more assertions on the first file;
receiving a second file available in the repository, the second file having a second file type, wherein the second file type is different from the first file type and the output file type;
generating a preview version of the second file in the output file type;
rendering the preview version of the second file in the output file type;
executing a test on the rendered preview version of the second file, wherein the tests are executed based on one or more assertions on the second file;
providing an indication of a result of executing the test on the rendered version of the first file as verification of the first file; and
providing an indication of a result of executing the test on the rendered version of the second file as verification of the second file.

9. The system of claim 8, wherein generating the preview version of the first file and generating the preview version of the second file are performed by a preview application executed by the testing system and wherein rendering the preview version of the first file and rendering the preview version of the second file are performed by a browser application executed by the testing system.

10. The system of claim 9, wherein the output file type comprises an HyperText Markup Language (HTML) file type.

11. The system of claim 10, wherein first file type and second file type comprise two of a plurality of different document file types, a plurality of different image file types, a plurality of different video file types, or a plurality of different three-dimensional model file types.

12. The system of claim 9, wherein executing the test on the rendered preview version of the first file and executing the test on the rendered preview version of the second file comprises controlling operation of the browser application.

13. The system of claim 12, wherein controlling operation of the browser application while executing the test on the rendered preview of the first file comprises causing the browser application to receive the second file and render the preview version of the second file.

14. The system of claim 9, wherein the first file type is a native file type of a first application different from the browser and wherein the second file type is a native file type of a second application different from the first application and the browser.

15. A non-transitory, computer-readable medium comprising a set of instructions stored therein which, when executed by a processor, causes the processor to perform automated browser testing on different native file types by:
receiving a first file available in a repository, the first file having a first file type;
generating a preview version of the first file in an output file type, the output file type being different from the first file type;
rendering the preview version of the first file in the output file type;
executing a test on the rendered preview version of the first file, wherein the tests are executed based on one or more assertions on the first file;
receiving a second file available in the repository, the second file having a second file type, wherein the second file type is different from the first file type and the output file type;
generating a preview version of the second file in the output file type;
rendering the preview version of the second file in the output file type;
executing a test on the rendered preview version of the second file, wherein the tests are executed based on one or more assertions on the second file;
providing an indication of a result of executing the test on the rendered version of the first file as verification of the first file; and
providing an indication of a result of executing the test on the rendered version of the second file as verification of the second file.

16. The non-transitory, computer-readable medium of claim 15, wherein generating the preview version of the first file and generating the preview version of the second file are performed by a preview application executed by the testing system, wherein rendering the preview version of the first file and rendering the preview version of the second file are performed by a browser application executed by the testing system, wherein the first file type is a native file type of a first application different from the browser and wherein the second file type is a native file type of a second application different from the first application and the browser.

17. The non-transitory, computer-readable medium of claim 16, wherein the output file type comprises an HyperText Markup Language (HTML) file type.

18. The non-transitory, computer-readable medium of claim 17, wherein first file type and second file type comprise two of a plurality of different document file types, a plurality of different image file types, a plurality of different video file types, or a plurality of different three-dimensional model file types.

19. The non-transitory, computer-readable medium of claim 16, wherein executing the test on the rendered preview version of the first file and executing the test on the rendered preview version of the second file comprises controlling operation of the browser application.

20. The non-transitory, computer-readable medium of claim 19, wherein controlling operation of the browser application while executing the test on the rendered preview of the first file comprises causing the browser application to receive the second file and render the preview version of the second file.

* * * * *